United States Patent [19]
Parmley, Sr.

[11] Patent Number: 5,504,991
[45] Date of Patent: Apr. 9, 1996

[54] APPARATUS AND METHOD FOR CONNECTING AND SECURING BATTERY PACKS TO BATTERY POWERED VEHICLES AND/OR BATTERY CHARGING DEVICES

[76] Inventor: Daniel W. Parmley, Sr., 129 E. Citation, Tempe, Ariz. 85284

[21] Appl. No.: 374,973

[22] Filed: Jan. 19, 1995

[51] Int. Cl.⁶ .............................. H01R 43/00; B32P 19/00
[52] U.S. Cl. .................... 29/825; 29/747; 320/2; 439/310; 439/500
[58] Field of Search ............................ 439/310, 500; 29/825; 320/2

[56] References Cited

U.S. PATENT DOCUMENTS 5,187,423  2/1993  Marton ........................................ 320/2
5,202,617  4/1993  Nor ............................................. 320/2
5,252,078  10/1993  Langenbahn ............................ 320/2 X
5,306,999  4/1994  Hoffman .................................... 320/2

FOREIGN PATENT DOCUMENTS 5-219606  8/1993  Japan ........................................ 320/2

Primary Examiner—Carl J. Arbes
Attorney, Agent, or Firm—Harry M. Weiss; Jeffrey D. Moy

[57] ABSTRACT

The present invention relates to an apparatus that connects and secures a battery pack to a battery powered vehicle and/or a battery charging device. The apparatus eliminates the use of the installer's hands on or near the battery cables or any other current carrying devices. The apparatus is comprised of a frame located around a perimeter portion of the battery pack, a first connector slidably coupled to the frame, a second connector coupled to the first connector and to a battery powered vehicle and/or a battery charging device, and a handle pivotally coupled to the frame and to the first connector for coupling the first connector to the second connector.

28 Claims, 3 Drawing Sheets

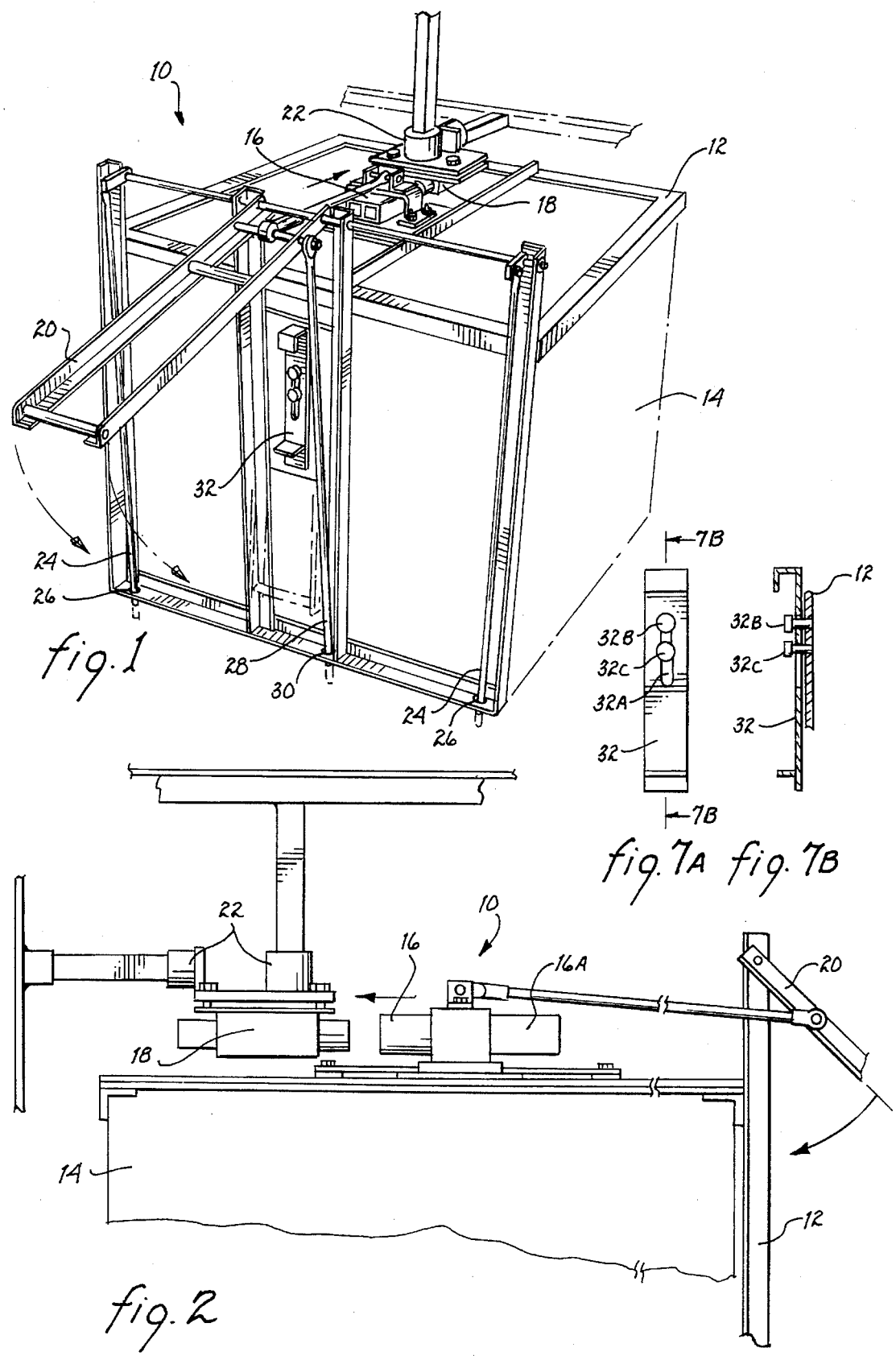

APPARATUS AND METHOD FOR CONNECTING AND SECURING BATTERY PACKS TO BATTERY POWERED VEHICLES AND/OR BATTERY CHARGING DEVICES

BACKGROUND OF THE INVENTION

1. Field of the Invention

This invention relates generally to battery pack connectors and, more specifically, to an apparatus and method for connecting and securing a battery pack to a battery powered vehicle and/or to a battery charging device.

2. Description of the Prior Art

Currently, the installation and removal of a battery pack from a battery powered vehicle and/or from a battery charging device is potentially hazardous to the individual installing or removing the battery pack. This is due to the close body and eye contact that is required by the individual during the installation and removal process. Existing battery pack connectors require the battery pack installer to place his or her hands on or near the battery cables as well as the battery connectors during the installation and removal process. As the battery cables and connectors become older, the insulation on the battery cables begin to deteriorate, thereby reducing the resistance in the battery cables. The deteriorated insulation raises the potential of the installer getting an electrical shock from the battery pack during the installation and removal process.

Another problem with current battery connectors is that most connectors require the battery installer to manually connect the battery pack to the battery powered vehicle and/or to the battery charging device. Connections that are dependent on the battery installer's strength for proper fitness and tightness may result in poor and inconsistent operation of the battery powered vehicle as well as inconsistent charging of the battery pack from the battery charging device. This is due to the fact that an installer who is unable to completely tighten the battery connector will not get a proper connection between the battery pack and the battery powered vehicle and/or the battery charging device, whereas an installer who overly tightens the battery connector may damage the connector, as well as the battery pack's terminal, thereby leading to inconsistent operation and/or charging of the battery pack. Incomplete and loose electrical connections between the battery packs and the battery connectors have been known to cause the battery connectors to burn up, thereby causing the battery packs to explode.

A further problem with devices that are currently being used for installing and removing battery packs is that these devices do not work very effectively in securing and holding the battery packs in position. Devices such as pins, bolts, springs, and other hardware devices are currently being used to secure the battery packs once the battery packs are connected to the battery powered vehicle and/or the battery charging device. Many times during the installation and removal process these securing devices are lost, damaged, or incorrectly used. Even when correctly used, bolts and nuts have a tendency to become cross-threaded or damaged, and springs have a tendency to become stretched, thereby losing their elasticity. Therefore, over time, these devices lose their ability to hold the battery packs in place.

Therefore, a need existed to provide an improved apparatus that is capable of connecting and securing a battery pack to a battery powered vehicle and/or a battery charging device. The improved battery connecting and securing apparatus must eliminate the use of the battery installer's hands on or near the battery cables or any other current carrying devices during the installation and removal process. The improved battery connecting and securing apparatus must also ensure that a proper connection is made between the battery pack and the battery powered vehicle as well as between the battery pack and the battery charging device. Finally, the improved battery connecting and securing device must be able to ensure that the battery packs do not move when the battery packs are connected to the battery powered vehicle and/or the battery charging device.

SUMMARY OF THE INVENTION

It is an object of the present invention to provide an improved apparatus and method for connecting and securing a battery pack in a battery powered vehicle and/or a battery charging device.

It is another object of the present invention to provide an improved apparatus and method for connecting and securing a battery pack in a battery powered vehicle and/or a battery charging device that will not require the battery pack installer to use his or her hands on or near the battery cables or any other current carrying devices.

It is still a further object of the present invention to provide an improved apparatus and method for connecting and securing a battery pack in a battery powered vehicle and/or a battery charging device that will hold the battery pack in position once the battery pack is connected to the battery powered vehicle and/or the battery charging device.

BRIEF DESCRIPTION OF THE PREFERRED EMBODIMENTS

In accordance with one embodiment of the present invention, an apparatus for connecting and securing a battery pack of a battery powered vehicle is disclosed. The apparatus comprises a frame located around a perimeter portion of the battery pack. A first connector is slidably coupled to the frame in order to facilitate coupling of the battery pack. A second connector is coupled to the first connector and to the battery powered vehicle for coupling the battery pack to the battery powered vehicle. A handle is pivotally coupled to the frame and the first connector for slidably coupling the first connector to the second connector.

In accordance with another embodiment of the present invention, an apparatus for connecting and securing a battery pack of a battery powered vehicle is disclosed. The apparatus comprises a frame located around a perimeter portion of the battery pack; first connector means slidably coupled to the frame for facilitating coupling of the battery pack; second connector means coupled to the first connector and to a battery charging device for coupling the battery pack to the battery charging device; and a handle pivotally coupled to said frame and said first connector means for slidably coupling said first connector means to said second connector means.

In accordance with another embodiment of the present invention, a method for connecting and securing a battery pack of a battery powered vehicle is disclosed, comprising the steps of providing an apparatus for connecting and securing the battery pack of a battery powered vehicle, the apparatus comprising a frame located around a perimeter portion of said battery pack, first connector means slidably coupled to said frame for facilitating coupling of said battery pack, second connector means coupled to said first connector means and said battery powered vehicle for coupling said battery pack to said battery powered vehicle, and handle means pivotally coupled to said frame and said first connector means for coupling said first connector means to said second connector means and for securing said battery pack from moving while said first connector is connected to said second connector; and moving said handle means to a closed position so that said first connector means is connected to said second connector means.

In accordance with still another embodiment of the present invention, a method for connecting and securing a battery pack of a battery powered vehicle is disclosed, comprising the steps of providing an apparatus for connecting and securing a battery pack of a battery powered vehicle, the apparatus comprising a frame located around a perimeter portion of said battery pack, first connector means slidably coupled to said frame for facilitating coupling of said battery pack, second connector means coupled to said first connector means and to a battery charging device for coupling said battery pack to said battery charging device, and handle means pivotally coupled to said frame and said first connector means for coupling said first connector means to said second connector means; and moving said handle means to a closed position so that said first connector means is connected to said second connector means.

The foregoing and other objects, features, and advantages of the invention will be apparent from the following, more particular, description of the preferred embodiments of the invention, as illustrated in the accompanying drawings.

BRIEF DESCRIPTION OF THE DRAWINGS

FIG. 1 is a perspective view of the battery connecting and securing apparatus of the present invention.

FIG. 2 is a side view of the battery connecting and securing apparatus of the present invention.

FIG. 7A is a front view of a safety latch used in the present invention.

FIG. 7B is a cross-sectional view of the safety latch of FIG. 7A taken along line 7B—7B.

DETAILED DESCRIPTION OF THE PREFERRED EMBODIMENTS

Figure 3:
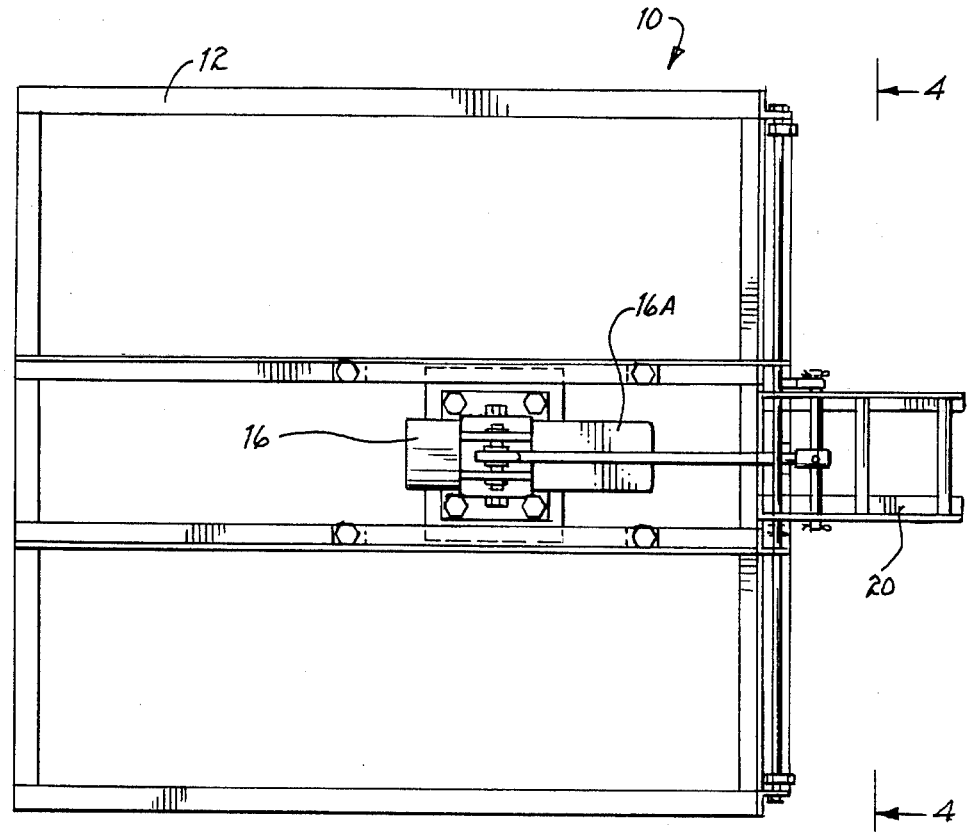
FIG. 3 is a top view of the battery connecting and securing apparatus of the present invention.
Figure 4:
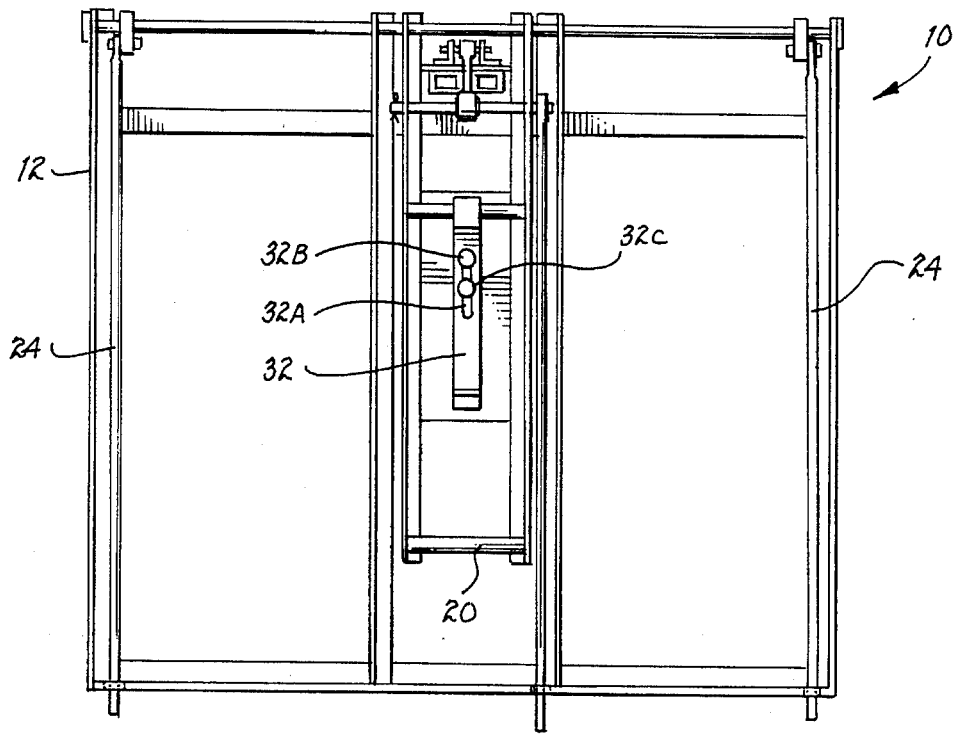
FIG. 4 is a front view of the battery connecting and securing apparatus of the present invention.

Referring to FIGS. 1–4, a battery connecting and securing apparatus 10 (hereinafter apparatus 10) is shown. The apparatus 10 is comprised of a frame 12 which is located around a perimeter portion of a battery pack 14. The frame 12 is preferably made of angle iron and can be designed to fit a variety of different size battery packs 14. The frame 12 may be easily installed or removed from the battery pack 14 by simply clipping the frame 12 onto a top section of the battery pack 14. The frame 12 is designed to allow easy access to the top of the battery pack 14 to allow an individual ample space for servicing of the battery pack 14.

A first connector 16 is slidably coupled to a top section of the frame 12. The battery pack 14 is coupled to one end 16A of the first connector 16. A second connector 18 is coupled to either a battery powered vehicle (not shown) or a battery charging device (not shown). The first connector 16 and the second connector 18 are preferably a water proof electrical type battery connector which will ensure a clean and environmentally protected connection. The first connector 16 and the second connector 18 have recessed current carrying surfaces to reduce the possibility of unintentional contact. In the preferred embodiment, the first connector 16 is a female type electrical connector and the second connector 18 is a male type electrical connector.

A handle 20 is pivotally coupled to the frame 12 and to the first connector 16. By moving the handle 20 downward to the closed position, the first connector 16 is slidably coupled to the second connector 18 thereby connecting the battery pack 14 to either the battery powered vehicle or the battery charging station depending on where the second connector 18 is coupled.

The second connector 18 is coupled to either the battery powered vehicle or the battery charging station via rubber vibration isolators 22. The rubber vibration isolators 22 act as an adjustment mechanism which allows the second connector 18 to adjust position in order to allow the second connector 18 to align with the first connector 16 when the first connector 16 is slidably coupled to the second connector 18.

The handle 20 is also coupled to at least one lock down rod 24. When the handle 20 is moved downward to the closed position, the lock down rod 24 also moves downward through an opening 26 in the frame 12 and onto a platform (not shown) of either the battery powered vehicle or the battery charging station. The lock down rod 24 secures the battery pack 14 to the platform, thus ensuring that the battery pack 14 does not move once the handle 20 is moved to the closed position and the first connector 16 is coupled to the second connector 18. When the handle 20 is moved upwards to the open position, the lock down rod 24 is retracted, thereby allowing the battery pack 14 to be moved. In the preferred embodiment, a lock down rod 24 is located on each side of the handle 20.

The opening 26 is positioned so least one lock down rod 24 is moved to a side of the opening 26 and positioned on the frame 12 when the handle 20 is moved to the open position. The lock down rod 24 rests on the frame 12, thereby preventing the movement of the handle 20 to the closed position without first realigning the lock down rod 24 with the opening 26.

A safety rod 28 is also coupled to the handle 20. When the handle 20 is moved to the closed position, the safety rod 28 moves downward through a second opening 30 in the frame 12. The safety rod 28 is lowered to a position that will prevent a lifting device (not shown) from being positioned underneath the battery pack 14, thus preventing the lifting device from moving the battery pack 14. When the handle 20 is raised to the open position, the safety rod 28 is retracted. This allows the transfer device to be placed underneath the battery pack 14 for lifting and moving of the battery pack 14.

A safety latch 32 is slidably coupled to the frame 12. The safety latch 32 is designed to prevent accidental closure or opening of the handle 20.

Referring to FIGS. 7A and 7B, the safety latch 32 comprises a channel 32A that runs longitudinally along a section of the safety latch 32. A holding device 32B is coupled to the frame 12 and is designed to hold the safety latch 32 in a normally closed position. A stopping device 32C is also coupled to the frame 12 and is designed to prevent the safety latch 32 from being raised to too high of a position. In order to move the handle 20 to the closed position, the safety latch 32 must be moved upwards along the channel 32A and held before moving the handle 20 downward to the closed position. Once the handle 20 is in the closed position, the safety latch 32 can be released thereby automatically locking the handle 20 in the closed position. The handle 20 cannot be moved to the open position without first lifting the safety latch 32 and then raising the handle 20.

Figure 5:
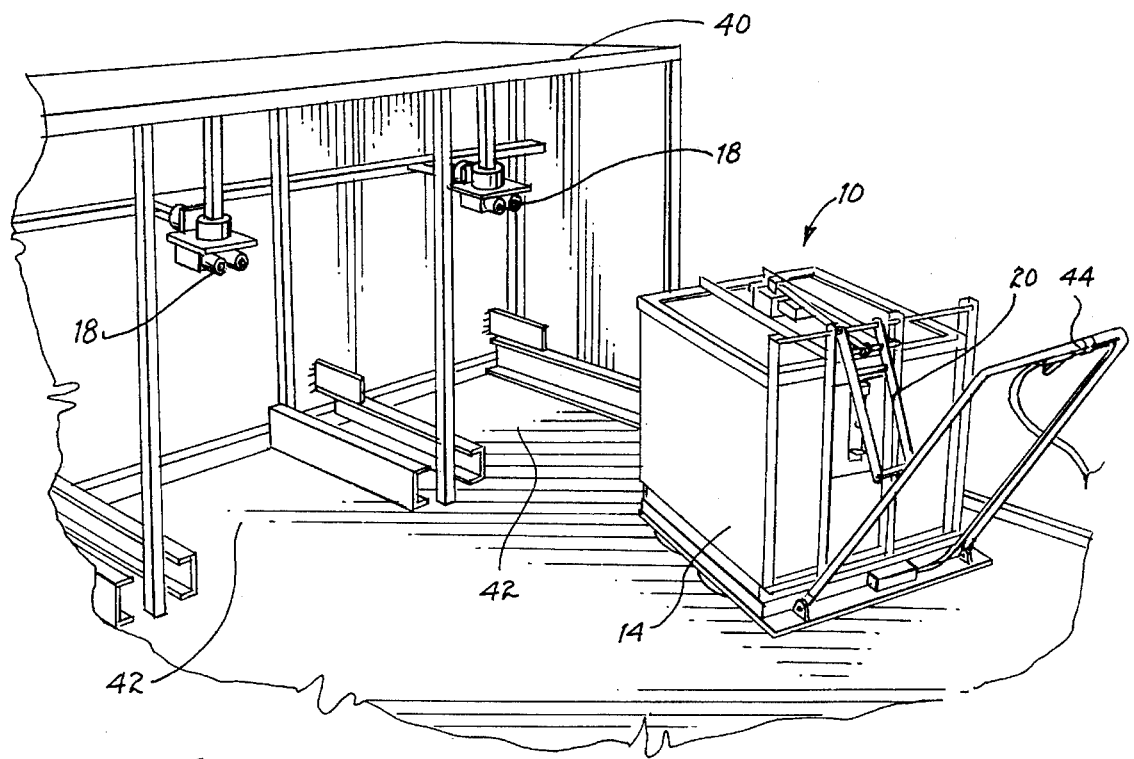
FIG. 5 is a perspective view of the battery connecting and securing apparatus located on a battery changing station.
Figure 6:
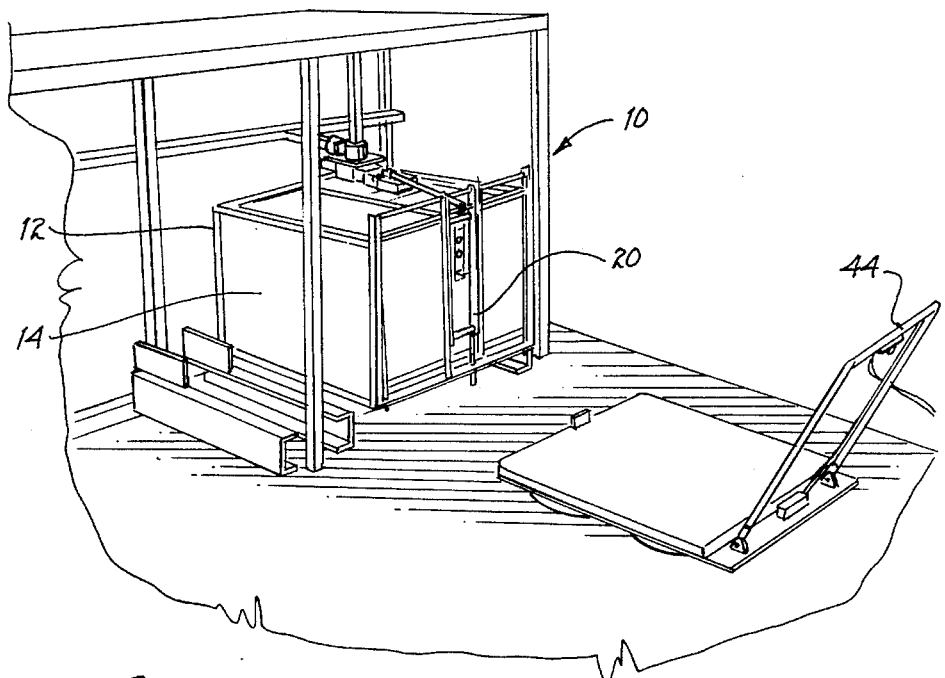
FIG. 6 is a perspective view of the battery connecting and securing device coupled to a battery charging device of the battery changing station of FIG. 5.

FIGS. 5 and 6 show how the apparatus 10 may be used. The apparatus 10 is clipped onto a battery pack 14. In this particular embodiment, the battery pack 14 is positioned on a battery changing station 40. The second connector 18 is coupled to a battery charging device (not shown). The battery pack 14 is moved to a battery charging stall 42 via a lifting and moving device 44. Once the battery pack is positioned in the battery charging stall 42, the lifting and moving device 44 is deactivated and removed thereby lowering the battery pack 14 into the battery charging stall 42 (see FIG. 6). Once the battery pack 14 is lowered into the battery charging stall 42, the handle 20 of apparatus 10 may be closed. The movement of the handle 20 to the closed position couples the battery pack 14 to the battery charging device, thereby allowing the battery pack 14 to be recharged. It should be noted that the safety latch 32 must be raised and the lock down rod 24 realigned with opening 26 prior to the handle 20 being lowered to the closed position. Once the battery pack 14 is recharged, the handle may be raised (the operator first needs to raise the safety latch 32 prior to raising the handle 20), thereby disconnecting the battery pack 14 from the battery charging device. The battery pack 14 may be moved via the lifting and moving device 44 and placed in a battery powered vehicle (not shown). The battery pack 14 may then be coupled to the battery powered vehicle (a second connector 18 must be coupled to the battery powered vehicle in order to connect the apparatus 10 to the battery powered vehicle) by raising the safety latch 32, aligning the lock down rod 24 with opening 26 and lowering the handle 20 to the closed position.

While the invention has been particularly shown and described with reference to preferred embodiments thereof, it will be understood by those skilled in the art that the foregoing and other changes in form and details may be made therein without departing from the spirit and scope of the invention.

I claim:

1. An apparatus for connecting and securing a battery pack of a battery powered vehicle comprising, in combination:

a frame located around a perimeter portion of said battery pack;

first connector means slidably coupled to said frame for facilitating coupling of said battery pack;

second connector means coupled to said first connector means and said battery powered vehicle for coupling said battery pack to said battery powered vehicle; and handle means pivotally coupled to said frame and said first connector means for slidably coupling said first connector means to said second connector means.

2. An apparatus for connecting and securing a battery pack of a battery powered vehicle in accordance with claim 1 further comprising at least one lock down rod means coupled to said handle means for holding said battery pack in position when said handle means is in a closed position and said first connector means is coupled to said second connector means.

3. An apparatus for connecting and securing a battery pack of a battery powered vehicle in accordance with claim 2 further comprising guide hole means located on a lower portion of said frame for allowing said lock down rod means to pass through said frame so said lock down rod means can hold said battery pack in position when said handle means is in the closed position and said first connector means is coupled to said second connector means.

4. An apparatus for connecting and securing a battery pack of a battery powered vehicle in accordance with claim 3 wherein said guide hole means are positioned so at least one of said at least one lock down rod means is moved to a side of said guide hole means and positioned on said frame when said handle means is moved to an open position preventing movement of said handle means to the closed position without first realigning said one of said at least one lock down rod means with said guide hole means.

5. An apparatus for connecting and securing a battery pack of a battery powered vehicle in accordance with claim 1 further comprising safety rod means coupled to said handle means for preventing a transfer device from being positioned underneath said battery pack when said handle means is in a closed position.

6. An apparatus for connecting and securing a battery pack of a battery powered vehicle in accordance with claim 1 further comprising safety latch means coupled to said frame for preventing movement of said handle means to a closed position without first moving said safety latch means and for preventing said handle means from being moved to an open position when said handle means is in the closed position without first moving said safety latch means.

7. An apparatus for connecting and securing a battery pack of a battery powered vehicle in accordance with claim 1 further comprising adjustment means coupled to said second connector means for allowing said second connector means to adjust position in order to align said second connector means with said first connector means when said first connector means is slidably coupled to said second connector means.

8. An apparatus for connecting and securing a battery pack of a battery powered vehicle comprising, in combination:

a frame located around a perimeter portion of said battery pack;

first connector means slidably coupled to said frame for facilitating coupling of said battery pack;

second connector means coupled to said first connector means and to a battery charging device for coupling said battery pack to said battery charging device; and handle means pivotally coupled to said frame and said first connector means for slidably coupling said first connector means to said second connector means.

9. An apparatus for connecting and securing a battery pack of a battery powered vehicle in accordance with claim 8 further comprising at least one lock down rod means coupled to said handle means for holding said battery pack in position when said handle means is in a closed position and said first connector means is coupled to said second connector means.

10. An apparatus for connecting and securing a battery pack of a battery powered vehicle in accordance with claim 9 further comprising guide hole means located on a lower portion of said frame for allowing said lock down rod means to pass through said frame so said lock down rod means can hold said battery pack in position when said handle means is in the closed position and said first connector means is coupled to said second connector means.

11. An apparatus for connecting and securing a battery pack of a battery powered vehicle in accordance with claim 10 wherein said guide hole means are positioned so at least one of said at least one lock down rod means is moved to a side of said guide hole means and positioned on said frame when said handle means is moved to an open position preventing movement of said handle means to the closed position without first realigning said one of said at least one lock down rod means with said guide hole means.

12. An apparatus for connecting and securing a battery pack of a battery powered vehicle in accordance with claim 8 further comprising safety rod means coupled to said handle means for preventing a transfer device from being positioned underneath said battery pack when said handle means is in a closed position.

13. An apparatus for connecting and securing a battery pack of a battery powered vehicle in accordance with claim 8 further comprising safety latch means coupled to said frame for preventing movement of said handle means to a closed position without first moving said safety latch means and for preventing said handle means from being moved to an open position when said handle means is in the closed position without first moving said safety latch means.

14. An apparatus for connecting and securing a battery pack of a battery powered vehicle in accordance with claim 8 further comprising adjustment means coupled to said second connector means for allowing said second connector means to adjust position in order to align said second connector means with said first connector means when said first connector means is slidably coupled to said second connector means.

15. An apparatus for connecting and securing a battery pack of a battery powered vehicle comprising, in combination:

a frame located around a perimeter portion of said battery pack;

first connector means slidably coupled to said frame for facilitating coupling of said battery pack;

second connector means coupled to said first connector means and said battery powered vehicle for coupling said battery pack to said battery powered vehicle;

handle means pivotally coupled to said frame and said first connector means for slidably coupling said first connector means to said second connector means;

at least one lock down rod means coupled to said handle means for holding said battery pack in position when said handle means is in a closed position and said first connector means is coupled to said second connector means;

guide hole means located on a lower portion of said frame for allowing said lock down rod means to pass through said frame so said lock down rod means can hold said battery pack in position when said handle means is in a closed position and said first connector means is connected to said second connector means, said guide hole means positioned so at least one of said at least one lock down rod means is moved to a side of said guide hole means and positioned on said frame when said handle means is moved to an open position preventing movement of said handle means to the closed position without first realigning said one of at least one lock down rod means with said guide hole means;

safety rod means coupled to said handle means for preventing a transfer device from being positioned underneath said battery pack when said handle means is in the closed position;

safety latch means coupled to said frame for preventing accidental movement of said handle means to the closed position without first moving said safety latch means and for preventing said handle means from being moved to the open position when said handle means is in the closed position without first moving said safety latch means; and adjustment means coupled to said second connector means for allowing said second connector means to adjust position in order to align said second connector means with said first connector means when said first connector means is slidably coupled to said second connector means.

16. An apparatus for connecting and securing a battery pack of a battery powered vehicle comprising, in combination:

a frame located around a perimeter portion of said battery pack;

first connector means slidably coupled to said frame for facilitating coupling of said battery pack;

second connector means coupled to first connector means and to a battery charging device for coupling said battery pack to said battery charging device;

handle means pivotally coupled to said frame and said first connector means for slidably coupling said first connector means to said second connector means;

at least one lock down rod means coupled to said handle means for holding said battery pack in position when said handle means is in a closed position and said first connector means is coupled to said second connector means;

guide hole means located on a lower portion of said frame for allowing said lock down rod means to pass through said frame so said lock down rod means can hold said battery pack in position when said handle means is in a closed position and said first connector means is connected to said second connector means, said guide hole means positioned so at least one of said at least one lock down rod means is moved to a side of said guide hole means and positioned on said frame when said handle means is moved to an open position preventing movement of said handle means to the closed position without first realigning said one of said at least one lock down rod means with said guide hole means;

safety rod means coupled to said handle means for preventing a transfer device from being positioned underneath said battery pack when said handle means is in the closed position;

safety latch means coupled to said frame for preventing accidental movement of said handle means to the closed position without first moving said safety latch means and for preventing said handle means from being moved to the open position when said handle means is in the closed position without first moving said safety latch means; and adjustment means coupled to said second connector means for allowing said second connector means to adjust position in order to align said second connector means with said first connector means when said first connector means is slidably coupled to said second connector means.

17. A method for connecting and securing a battery pack of a battery powered vehicle comprising the steps of:

providing an apparatus for connecting and securing said battery pack of a battery powered vehicle comprising:
a frame located around a perimeter portion of said battery pack;

first connector means slidably coupled to said frame for facilitating coupling of said battery pack;

second connector means coupled to said first connector means and said battery powered vehicle for coupling said battery pack to said battery powered vehicle; and handle means pivotally coupled to said frame and said first connector means for coupling said first connector means to said second connector means and for securing said battery pack from moving while said first connector is connected to said second connector; and moving said handle means to a closed position so that said first connector means is connected to said second connector means.

18. The method of claim 17 wherein said step of providing an apparatus for connecting and securing said battery pack further comprises the step of providing at least one lock down rod means coupled to said handle means for holding said battery pack in position when said handle means is in the closed position and said first connector means is coupled to said second connector means.

19. The method of claim 18 wherein said step of providing at least one lock down rod means further comprises the step of providing guide hole means located on a lower portion of said frame for allowing said lock down rod means to pass through said frame so said lock down rod means can hold said battery pack in position when said handle means is in the closed position and said first connector means is connected to said second connector means, said guide hole means positioned so at least one of said at least one lock down rod means is moved to a side of said guide hole means and positioned on said frame when said handle means is moved to an open position preventing movement of said handle means to the closed position without first realigning said one of said at least one lock down rod means with said guide hole means.

20. The method of claim 17 wherein said step of providing an apparatus for connecting and securing a battery pack further comprises the step of providing safety rod means coupled to said handle means for preventing a transfer device from being positioned underneath said battery pack when said handle means is in the closed position.

21. The method of claim 17 wherein said step of providing an apparatus for connecting and securing a battery pack further comprises the step of providing safety latch means coupled to said frame for preventing movement of said handle means to the closed position without first moving said safety latch means and for preventing said handle means from being moved to an open position when said handle means is in the closed position without first moving said safety latch means.

22. The method of claim 17 wherein said step of providing an apparatus for connecting and securing a battery pack further comprises the step of providing adjustment means coupled to said second connector means for allowing said second connector means to adjust position in order to align said second connector means with said first connector means when said first connector means is slidably coupled to said second connector means.

23. A method for connecting and securing a battery pack of a battery powered vehicle comprising the steps of:

providing an apparatus for connecting and securing a battery pack of a battery powered vehicle comprising:
a frame located around a perimeter portion of said battery pack;

first connector means slidably coupled to said frame for facilitating coupling of said battery pack to second connector means;

second connector means coupled to said first connector means and to a battery charging device for coupling said battery pack to said battery charging device; and handle means pivotally coupled to said frame and said first connector means for coupling said first connector means to said second connector means; and moving said handle means to a closed position so that said first connector means is connected to said second connector means.

24. The method of claim 23 wherein said step of providing an apparatus for connecting and securing a battery pack further comprises the step of providing at least one lock down rod means coupled to said handle means for holding said battery pack in position when said handle means is in the closed position and said first connector means is coupled to said second connector means.

25. The method of claim 24 wherein said step of providing an apparatus for connecting and securing a battery pack further comprises the step of providing guide hole means located on a lower portion of said frame for allowing said lock down rod means to pass through said frame so said lock down rod means can hold said battery pack in position when said handle means is in the closed position and said first connector means is connected to said second connector means, said guide hole means positioned so at least one of said at least one lock down rod means is moved to a side of said guide hole means and positioned on said frame when said handle means is moved to an open position to prevent movement of said handle means to the closed position without first realigning said one of said at least one lock down rod means with said guide hole means.

26. The method of claim 23 wherein said step of providing an apparatus for connecting and securing a battery pack further comprises the step of providing safety rod means coupled to said handle means for preventing a transfer device from being positioned underneath said battery pack when said handle means is in the closed position.

27. The method of claim 23 wherein said step of providing an apparatus for connecting and securing a battery pack further comprises the step of providing safety latch means coupled to said frame for preventing movement of said handle means to the closed position without first moving said safety latch means and for preventing said handle means from being moved to an open position when said handle means is in the closed position without first moving said safety latch means.

28. The method of claim 23 wherein said step of providing an apparatus for connecting and securing a battery pack further comprises the step of providing adjustment means coupled to said second connector means for allowing said second connector means to adjust position in order to align said second connector means with said first connector means when said first connector means is slidably coupled to said second connector means.

\* \* \* \* \*